United States Patent

Sugimoto et al.

[11] Patent Number: 4,486,545
[45] Date of Patent: Dec. 4, 1984

[54] SIO$_2$-CAO BASED LOW CUBICALLY EXPANSIVE FLAME-SPRAYING MATERIAL

[75] Inventors: Hiroyuki Sugimoto, Bizen; Kazuo Fukaya, Tama; Yoji Kogughi, Tokyo, all of Japan

[73] Assignees: Shinagawa Refractories, Co., Ltd.; Nippon Kokan Kabushiki Kaisha; Nippon Sanso Kabushiki Kaisha, all of Japan

[21] Appl. No.: 477,759

[22] Filed: Mar. 22, 1983

[30] Foreign Application Priority Data

Feb. 28, 1983 [JP] Japan ................................. 58/27809
Apr. 2, 1983 [JP] Japan ................................. 57/53755

[51] Int. Cl.$^3$ ...................... C04B 35/14; C04B 35/16
[52] U.S. Cl. ..................................... 501/123; 501/133
[58] Field of Search ............................... 501/133, 123

[56] References Cited

U.S. PATENT DOCUMENTS

| | | | |
|---|---|---|---|
| 1,934,263 | 11/1933 | Hacks et al. | 75/87 |
| 2,573,264 | 10/1951 | Keltz | 501/133 |
| 2,968,083 | 1/1961 | Lentz et al. | 25/155.5 |
| 3,082,104 | 3/1963 | Belz | 106/58 |
| 3,620,783 | 11/1971 | Mahler et al. | 501/133 |
| 3,684,538 | 8/1972 | Wright | 501/133 |
| 3,684,560 | 8/1972 | Brichard et al. | 117/105.1 |
| 3,788,866 | 1/1974 | Flood et al. | 501/133 |
| 3,826,658 | 7/1974 | Nicholas | 501/133 |
| 4,346,177 | 8/1982 | Cochet et al. | 501/133 |

FOREIGN PATENT DOCUMENTS 5716309 10/1979 Japan ................................. 427/423

*Primary Examiner*—James Poer
*Attorney, Agent, or Firm*—Wenderoth, Lind & Ponack

[57] ABSTRACT

The present invention provides a flame-spraying material composed of a powder mixture having a particle size not more than 0.5 mm and essentially comprising 85 to 98% by weight of SiO$_2$ and 2 to 15% by weight of CaO, and also comprising 0.05 to 1.0% by weight of Li$_2$O in addition to the above which show a good adhesion rate and high mechanical strength of the flame-spray deposited coating as well as a tendency towards higher anti-spalling due to the reduced melt viscosity and hot linear thermal expansion rate similar to that of silica brick.

1 Claim, No Drawings

SIO₂-CAO BASED LOW CUBICALLY EXPANSIVE FLAME-SPRAYING MATERIAL

BACKGROUND OF THE INVENTION

The present invention relates to a flame-spraying material and in particular a flame-spraying material for repairing, by flame-spraying, any damaged part of a furnace or kiln such as a coke oven and the like where a number of heating-and-cooling cycles are carried out.

Recently, repair of coke ovens by flame-spraying has been effected and outstanding effects have been demonstrated in relation to the repair time, the adhesive strength of the repaired part, durability and the like. It has been known to employ a flame-spraying material comprised of about 70%$SiO_2$, said flame spraying material having a refractiveness of 1100° C. to 1280° C.

Coke ovens are lined with silica bricks having a coefficient of thermal expansion that rapidly increases between 300° C. and 500° C. and keeps a level without significant increase temperatures in excess of 500° C. For this reason, the silica bricks have a very high resistance to thermal spalling where they are used at temperatures over 500° C. However, if the silica bricks are repaired, once they are damaged, with a flame-spray material comprising approximately 70% by weight of $SiO_2$, no adequate endurance can be achieved at present as a result of the peeling off of the flame-sprayed coating due to the differences in the hot expansion behavior between the base silica bricks and the flame-sprayed coating which causes significant thermal stress therebetween as the flame-sprayed coating linearly expands thermally, contrary to silica bricks, up to about 1000° C.

SUMMARY OF THE INVENTION

Accordingly, the object of the present invention is to provide a flame-spraying material excellent in anti-spalling properties due to its very low hot thermal expansion rate as well as having hot thermal expansion behavior similar to that of silica bricks.

Broadly, the flame-spraying material according to the present invention essentially comprises either 85 to 98% by weight of $SiO_2$ and 2 to 15% by weight of CaO or 85 to 98% by weight of $SiO_2$, 2 to 15% by weight of CaO and further 0.05 to 1.0% by weight of $Li_2O$.

In a preferred embodiment, the flame-spraying material comprises a powder mixture having a particle size of not more than 0.5 mm and essentially consisting of 85 to 98% by weight of $SiO_2$, 2 to 15% by weight of CaO or of 85 to 98% by weight of $SiO_2$, 2 to 15% by weight of CaO, 0.05 to 1.0% by weight of $Li_2O$ and the balance, in either case being not more than 5% by weight of incidental impurities, same flame-spraying material being adhered to the walls of a furnace while changing to a semi-molten or molten state in a flame resulting from the combustion of an oxygen-fuel gas mixture.

DETAILED EXPLANATION OF THE INVENTION

The flame-spraying material according to the first embodiment of the invention can be produced by combining silica based material such as silica, silica sand, a silicate mineral or the like and CaO-$SiO_2$ based material such as Portland cement, wollastonite, dicalcium silicate or the like. As the CaO-$SiO_2$ type raw material, preference should be given to Portland cement, wollastonite and dicalcium silicate as given above, while CaO cannot flame-sprayed. $CaCO_3$ and $Ca(OH)_2$ are less preferred due to their high thermal loss resulting from the evolution of gases derived from their decomposition.

The flame-spraying material in a second embodiment according to the invention can be produced by combining silica based material such as silica, silica sand, a silicate mineral or the like, CaO-$SiO_2$ based material such as Portland cement, wollastonite, dicalcium silicate or the like and a lithium mineral such as spodumene, petalite or the like. As to the silica based material and the CaO-$SiO_2$ based material preference should be given to those set forth in the first embodiment.

As set forth in the forgoing, the flame-spraying material according to the invention shows a thermal expansion behavior similar to that of silica bricks provided that the material has the compositions defined above. If the CaO content is less than 2% by weight, the viscosity of the fused material during flame-spraying using the oxygen-fuel combustion gas mixture cannot be reduced to an extent such that adequate fuse-adhering can be achieved because of the very high melt-viscosity of the remaining $SiO_2$, thus resulting in an unsintered flame-sprayed coating, having a very low strength adhered coating, with a lower adhesion proportion. On the other hand, if CaO exceeds 15% by weight the flame-spraying material would more and more show a linearly increasing thermal expansion rate as a result of the gradual disappearance of the thermal expansion properties similar to those of silica bricks, thus showing an adverse propensity to peeling and damage. If the $SiO_2$ content is less than 85% by weight or in excess of 98% by weight, similar adverse effects give rise to those corresponding to the case where the CaO contents exceeds 15% by weight or it is less than 2% by weight. The addition of $Li_2O$ permits production a low thermal expansion flame-spray coating. If the addition, however, is less than 0.05% by weight the characterizing properties of the low thermal expansion can hardly be achieved, on the other hand, if it exceeds 1.0% by weight the refractoriness of the flame-sprayed coating is decreased. If incidental impurities exist in excess of 5% by weight, the thermal expansion rate increases linearly which is not preferable as set forth above. Should the particles be larger than 0.5 mm in size, they do not melt in the flame of the oxygen-fuel combustion gas and almost of them are lost as a re-bound loss, responsive to a lower adhering rate.

The flame-spraying material of the present invention have prominent technical significance over the prior art ones in that they show in improved adhesion rate of the flame-sprayed material and improved hot mechanical strength of the flame-sprayed coating due to the reduction of the melt-viscosity of $SiO_2$ stemming from the addition of CaO and $Li_2O$ in the specified amount, $SiO_2$ alone giving too high a melt-viscosity and also a lower adhering rate along with a low mechanical strength deposited coating, and in that they make possible the suppression of peeling and damage to the deposited flame-sprayed coating by retaining a hot expansion behavior similar to that of silica bricks. The flame-spraying material can be used to repair a furnace in operation.

The following Examples are provided to illustrate, but not to limit the present invention.

EXAMPLE I–IV AND COMPARATIVE EXAMPLE I–II

The flame-spray compositions indicated in the following Table 1 were prepared and were flame-sprayed on a silica brick using conventional techniques. The results are shown in Table 1.

TABLE 1

| | Example | | | | Prior Art Comparative Examples | |
|---|---|---|---|---|---|---|
| | Present Invention Examples | | | | | |
| Items | I | II | III | IV | I | II |
| Formulation | | | | | | |
| chamotte | | | | | 85 | 70 |
| silica | 90 | 80 | 80 | 90 | | |
| silicate rock | | | | 5 | | |
| white cement | | | 10 | | | |
| wollastonite | 10 | 20 | 10 | 5 | | |
| sodium silicate anhydrous | | | | | 15 | 30 |
| Chemical Composition | | | | | | |
| $SiO_2$ | 93.4 | 88.7 | 85.8 | 93.7 | 65 | 66 |
| CaO | 4.8 | 9.7 | 11.4 | 2.4 | | |
| impurities | 1.8 | 1.6 | 2.8 | 3.9 | 35 | 34 |
| Test Result | | | | | | |
| adhesive strength (kg/cm$^2$)* | 100 | 80 | 75 | 90 | 10 | 6 |
| bending strength (kg/cm$^2$)* | 170 | 150 | 120 | 110 | 15 | 12 |
| adhesion rate (%) | 70 | 85 | 80 | 70 | 75 | 80 |
| # of cycles until peeling occurs under a thermal cycle test** | No peeling | 45 | 40 | No peeling | 20 | 15 |

*values measured at 1000° C.
**substrate: silica brick;
A cycle consists of changing the temperature between 1200° C. and 300° C. for 15 minutes, such cycles are repeated 50 times.

EXAMPLE V–IX AND COMPARATIVE EXAMPLE III–IV

The flame-spray composition Table II set forth hereinafter were prepared and were flame sprayed on a silica brick using conventional techniques. The results are represented in Table 2.

TABLE 2

| | Example | | | | | Prior Art Comparative Examples | |
|---|---|---|---|---|---|---|---|
| | Present Invention Examples | | | | | | |
| Items | V | VI | VII | VIII | IX | III | IV |
| Formulation | | | | | | | |
| chamotte | | | | | | 85 | 75 |
| silica | 90 | 85 | 80 | 80 | 75 | | |
| silicate rock | | 10 | | | | | |
| white cement | | 3.5 | | | 8 | | |
| wollastonite | 5 | | 5 | 15 | 12 | | |
| spodumene | 5 | | | | | | |
| petalite | | 1.5 | 15 | 5 | 5 | | |
| sodium silicate anhydrous | | | | | | 15 | 30 |
| Chemical Composition | | | | | | | |
| $SiO_2$ | 94.0 | 94.0 | 92.5 | 90.2 | 85.6 | 65 | 66 |
| CaO | 2.1 | 2.3 | 2.2 6.5 | 10.4 | | | |
| $Li_2O$ | 0.4 | 0.06 | 0.6 | 0.2 | 0.2 | | |
| impurities | 3.5 | 3.6 | 4.7 | 3.1 | 3.8 | 35 | 34 |
| Test Results | | | | | | | |
| adhesive strength (kg/cm$^2$)* | 95 | 85 | 120 | 110 | 140 | 10 | 6 |
| bending strength (kg/cm$^2$)* | 115 | 100 | 135 | 170 | 180 | 15 | 12 |
| adhesive rate (%) | 80 | 75 | 90 | 80 | 85 | 75 | 80 |
| # of cycles until peeling occurs under a thermal cycle test** | No peeling | No peeling | No peeling | No peeling | No peeling | 20 | 15 |

*values measured at 1000° C.
**substrate: silica brick;
A cycle consists of changing the temperature between 1200° C. and 300° C. for 15 minutes, such cycles are repeated 50 times.

As seen from above Tables 1 and 2 the flame-spraying materials according to the invention show both better adhesion strength and bending strength over those of the prior art (comparative Example) and also show no peeling from the silica brick substrate in a heating-cooling thermal cycle test, thus showing superior properties over the prior art flame-spraying material.

What is claimed is:

1. A flame-spraying material essentially comprising 85 to 98% by weight of $SiO_2$, 2 to 15% by weight of CaO and 0.05 to 1.0% by weight of $Li_2O$.

* * * * *